(12) United States Patent
Herickhoff et al.

(10) Patent No.: US 10,455,762 B1
(45) Date of Patent: Oct. 29, 2019

(54) SUGAR BEET HARVEST APPARATUS

(71) Applicants: Mark F. Herickhoff, Elrosa, MN (US);
Stephen D. Ruegemer, Sauk Centre, MN (US)

(72) Inventors: Mark F. Herickhoff, Elrosa, MN (US);
Stephen D. Ruegemer, Sauk Centre, MN (US)

(*) Notice: Subject to any disclaimer, the term of this patent is extended or adjusted under 35 U.S.C. 154(b) by 0 days.

(21) Appl. No.: 16/101,477

(22) Filed: Aug. 12, 2018

Related U.S. Application Data

(60) Provisional application No. 62/544,759, filed on Aug. 11, 2017.

(51) Int. Cl.
*A01D 25/04* (2006.01)
*A01D 27/04* (2006.01)

(52) U.S. Cl.
CPC ............ *A01D 25/04* (2013.01); *A01D 27/04* (2013.01)

(58) Field of Classification Search
CPC ..... A01D 25/04; A01D 25/042; A01D 25/044
See application file for complete search history.

(56) References Cited

U.S. PATENT DOCUMENTS

| | | |
|---|---|---|
| 512,287 A | 1/1894 | Gird |
| 544,850 A | 8/1895 | Hoefs |
| 712,951 A | 11/1902 | Morison |
| 823,583 A | 6/1906 | Conner |
| 839,918 A | 1/1907 | Conner |
| 860,655 A | 7/1907 | Goodfellow |
| 873,040 A | 12/1907 | Goodfellow |
| 910,467 A | 1/1909 | Fox |
| 919,342 A | 4/1909 | Gettelmann |
| 991,149 A | 5/1911 | Goodfellow |
| 1,155,319 A | 9/1915 | Moller et al. |
| 1,210,057 A | 12/1916 | Fanger |
| 1,211,030 A | 1/1917 | Addleman |
| 1,231,836 A | 7/1917 | Arndt |
| 1,256,119 A | 2/1918 | Fanger |
| 1,263,529 A | 4/1918 | Coppins |
| 1,269,789 A | 6/1918 | Courtney |
| 1,273,756 A | 7/1918 | Fanger |
| 1,273,757 A | 7/1918 | Fanger |
| 1,280,207 A | 10/1918 | Glaze |

(Continued)

FOREIGN PATENT DOCUMENTS

| | | | |
|---|---|---|---|
| DE | 3635403 A1 * | 4/1988 | ........... A01D 25/005 |
| EP | 0158763 A1 * | 10/1985 | ............. A01D 19/16 |
| FR | 2215886 A1 * | 8/1974 | ............. A01D 25/04 |

*Primary Examiner* — Joshua T Kennedy
(74) *Attorney, Agent, or Firm* — Albert W. Watkins

(57) ABSTRACT

A sugar beet harvest apparatus provides in sequence a pair of field cultivator teeth, a pair of discs, and subsequent thereto a V-shaped basket of helical screw propellers. The field cultivator teeth and discs may be spaced nominally to engage both sides of a single crop row, or in an alternative embodiment may be spaced nominally to engage one side of a first crop row, and the opposed side of a second adjacent crop row. In either case, the field cultivator teeth pierce the soil and gently lift the root crop. The discs may flip the beets and soil into the helical screw propellers. A pair of ground-level helical screw propellers lift the root crop, while pulverizing the soil and cleaning the root crop in the process. Each of the helical screw propellers lift the root crop, while pushing rocks and soil rearward proximate to the soil surface.

16 Claims, 5 Drawing Sheets

(56) References Cited

U.S. PATENT DOCUMENTS

| | | | |
|---|---|---|---|
| 1,403,929 A | | 1/1922 | Welton, Sr. |
| 1,436,396 A | | 11/1922 | Honsinger |
| 1,582,403 A | | 4/1926 | Hunter |
| 1,668,157 A | | 5/1928 | Kopitke et al. |
| 1,862,399 A | | 6/1932 | Hannah |
| RE19,672 E | | 8/1935 | Malcom et al. |
| 2,308,392 A | | 1/1943 | Roepke |
| 2,331,520 A | | 10/1943 | Urschel |
| 2,337,699 A | | 12/1943 | Walz |
| 2,357,810 A | * | 9/1944 | Christiansen ........ A01D 25/042 171/36 |
| 2,418,575 A | * | 4/1947 | Christiansen ........ A01D 25/042 171/36 |
| 2,438,627 A | | 3/1948 | Walz et al. |
| 2,595,340 A | | 5/1952 | Diethelm |
| 2,608,815 A | * | 9/1952 | Graaff ................. A01D 25/044 171/103 |
| 2,626,497 A | | 1/1953 | Bohmker |
| 2,773,343 A | | 12/1956 | Oppel |
| 2,993,545 A | | 7/1961 | Hammer et al. |
| 3,010,522 A | | 11/1961 | Oppel |
| 3,183,976 A | | 5/1965 | Rollins |
| 3,473,614 A | * | 10/1969 | Kemp ..................... A01D 23/04 171/61 |
| 3,827,503 A | * | 8/1974 | Hansen .................. A01D 45/26 171/38 |
| 4,049,058 A | | 9/1977 | Eisenhardt et al. |
| 4,137,973 A | * | 2/1979 | Schwitters ............ A01D 25/04 171/58 |

\* cited by examiner

SUGAR BEET HARVEST APPARATUS

CROSS REFERENCE TO RELATED APPLICATIONS

The present application claims the benefit of United States provisional patent application 62/544,759 filed Aug. 11, 2017 of like title, the teachings and entire contents which are incorporated herein by reference.

BACKGROUND OF THE INVENTION

1. Field of the Invention

The present invention pertains generally to agriculture, and more particularly to the harvesting of root and tuber crops including but not limited to sugar beets. In one preferred manifestation, the present invention pertains particularly to an apparatus and method for unearthing the crop using a plurality of digging apparatus and plant separators.

2. Description of the Related Art

Root crops fill many unique needs, and as a result are economically very important and valuable. For the purposes of the present disclosure, root crops will be understood to include beets and carrots, and will also be understood to include tuber crops and other root vegetables such as but not limited to potatoes, sweet potatoes, and yams. In addition, purposes of the present disclosure various root herbs such as but not limited to ginger, ginseng, and turmeric will also be considered to be root crops.

At the time of harvest, these root crops must be removed from the earth. The manual technique for removal of many root crops is to either individually pull each plant from the earth, or to use various tools such as shovels and forks to dig and extract the root crops from the soil. One common tool that is used is a multi-tined fork that allows a person to simultaneously lift the root from the earth and also to release extraneous earth therefrom. As may be appreciated, manual techniques are labor intensive and do not yield perfect results. In the case of pulling the plants from the earth, the stems may break off, leaving the root in the earth. In addition, in many cases a person may have to remove one plant at a time, rendering the process slow, tedious, and undesirably labor intensive. In the case of a multi-tined fork, a person must dig well below the level of the lowest expected root to avoid piercing roots with a tine of the fork, and then the person may still have to sift through the soil to remove the root crop therefrom.

Early assisted harvesting equipment was horse-drawn, and left much to be desired. Consequently, as with the rest of agriculture, there has been a nearly complete shift from manual and horse-drawn processes and equipment to tractor-powered or fully self-propelled machinery.

While many modern crop harvesters are both highly automated and also highly efficient at separating the cash crop from agricultural residue, this is particularly difficult and challenging with root crops. There are several factors that continue to challenge automated harvesting. A primary challenge is the variability of both type and condition of the soil from which the crop must be removed. This can range from dry, sandy soil that is almost dust like, to dry and hard clay that is extremely difficult to pierce with the equipment and equally difficult to break apart. Wet soils can be very sticky, and so can bind and interfere with proper equipment operation. In addition, the wet and sticky soil is also difficult to separate from crop and so may be harvested in relatively greater percentage therewith. Further compounding the challenges, there may also be aggregate or rock within the soil, and some of the rocks may have dimensions that are within the acceptable range for the desired root crop. Finally, rough handling through machinery can also undesirably damage the root crops. Each of these challenges must be addressed to more or less of a degree for each different root crop to be efficiently harvested.

Sugar beets are a particular type of root crop that have continued to prove difficult to harvest. A few artisans have mechanized the manual grasping and lifting process. Exemplary patents, the relevant teachings and contents which are incorporated herein by reference, include: U.S. Pat. No. 1,280,207 by Glaze, entitled "Beet harvester"; and Re 19,672 by Malcom et al, entitled "Beet Harvester". However, as with the manual process these machines are prone to breaking the tops and leaving the beets in the field. In addition, when beets are delivered to a processing facility, the tops are most commonly required to be removed. The foliage is of no value in the sugar extraction process, and interferes significantly with the storage of the beets prior to being processed.

As a result, modern agricultural procedure includes cutting and removing the crown of the beet and all foliage just prior to removing the sugar beets from the earth. This is sometimes referred to as topping the beets. Next, a typical sugar beet harvester will with each row being harvested first engage the sugar beets with lifter wheels sometimes known as Oppel wheels, and then separate the sugar beets from the lifter wheels with paddles. The paddles transfer the beets to grabrolls, cleaning rollers, agitators, or other variants that are designed to separate soil from the sugar beets. Exemplary U.S. patents, the teachings which are incorporated herein by reference, include: U.S. Pat. No. 2,773,343 by Oppel, entitled "Cooperating rotatable disk type beet harvester"; U.S. Pat. No. 2,993,545 by Hammer et al, entitled "Finger wheel assembly for a beet harvester"; U.S. Pat. No. 3,010,522 by Oppel, entitled "Beet harvester"; U.S. Pat. No. 3,183,976 by Rollins, entitled "Beet row finder and steering mechanism for beet harvesters"; and U.S. Pat. No. 4,049,058 by Eisenhardt et al, entitled "Sugar beet harvester".

As an alternative to the lifter wheels and paddles, lifting shares or similar apparatus may be used. The lifting devices in this case may be steel shares, similar in some regard to the well-known plowshare. Exemplary U.S. patents, the teachings which are incorporated herein by reference, include: U.S. Pat. No. 919,342 by Gettelmann, entitled "Beet harvester"; U.S. Pat. No. 2,308,392 by Roepke, entitled "Beet harvester"; U.S. Pat. No. 2,331,520 by Urschel, entitled "Beet harvester"; U.S. Pat. Nos. 2,337,699 and 2,438,627 by Walz and entitled "Beet harvester".

With ideal harvesting equipment, field conditions, and soil type, these known techniques will result in accurate extraction of the beets, while leaving behind many rocks and most soil. Unfortunately, even as well developed as this technology is, there still remains a substantial amount of soil and rock that is not separated. Unfortunately, a rock may sometimes become jammed in the pinch wheels, and may not be separated by the paddles. Similar jamming can occur when lifting shares encounter larger rocks and debris. In either case, a jam may render the lifting apparatus inoperative. In addition, in the case of the Oppel wheels, the pinch wheels may impact larger rocks in the soil. In such case, the rocks may either become lodged or, worse, may bend or otherwise damage the pinch wheels. With a multi-row harvester, this can lead to a significant length of a row that is left in the field before the driver recognizes that there is a problem and stops the harvesting machinery. Depending on the machinery, the equipment might no longer be able to harvest the row, or it may not be economically viable. Consequently, some portion of the crop may very undesirably be left in the field.

In addition to the losses in the field, the soil and rock that is picked up by the harvester is undesirably transported with the beets, commonly on trucks, to a sugar beet processing facility. As may be appreciated, the soil and rock take up space and add weight to the load, both that would much better be served by filling with more beets. The soil and rock must eventually be separated from the beets prior to extracting the sugar therefrom. Consequently, at many processing facilities there may be additional separation immediately at the time of delivery using a piler. In such case, the piler will separate soil and rock referred to as tare. The tare is deducted from the total delivery weight to yield a net crop delivery, meaning the volume and expense required to transport is completely wasted. Worse, the tare cannot accumulate at the processing facility, and so will also need to be loaded and transported back to the originating farm or to another location away from the processing facility. This means that the tare is not only needlessly transported to the processing facility, it also must be reloaded and transported away therefrom.

Another technique for removing sugar beets from the earth involves the use of a pair of rotating pullers or rollers that typically are each individually driven by and extend co-axially from an inclined rotating shaft. The rotating shaft and pullers or rollers will, other than the incline into the earth, be oriented generally parallel to the direction of travel of the harvesting equipment. Exemplary U.S. and Foreign patents and published applications, the teachings which are incorporated herein by reference, include: U.S. Pat. No. 512,287 by Gird, entitled "Beet Harvester"; U.S. Pat. No. 544,850 by Hoefs, entitled "Canal or ditch digging machine"; U.S. Pat. No. 712,951 by Morison, entitled "Beet Digger"; U.S. Pat. No. 823,583 by Conner, entitled "Beet Harvesting Machine"; U.S. Pat. No. 839,918 by Conner, entitled "Guide for root harvesting and cultivating machines"; U.S. Pat. No. 860,655 by Goodfellow, entitled "Beet Harvester"; U.S. Pat. No. 873,040 by Goodfellow, entitled "Beet Harvester"; U.S. Pat. No. 910,467 by Fox, entitled "Beet Lifting Mechanism"; U.S. Pat. No. 991,149 by Goodfellow, entitled "Beet Harvester"; U.S. Pat. No. 1,155,319 by Moller et al, entitled "Beet Harvester"; U.S. Pat. No. 1,210,057 by Fanger, entitled "Beet Harvester"; U.S. Pat. No. 1,211,030 by Addleman, entitled "Beet lifting and digging device"; U.S. Pat. No. 1,231,836 by Arndt, entitled "Beet Harvester"; U.S. Pat. No. 1,256,119 by Fanger, entitled "Front Auger support and bearing for beet harvester"; U.S. Pat. No. 1,263,529 by Coppins, entitled "Beet Harvester"; U.S. Pat. No. 1,269,789 by Courtney, entitled "Beet Harvesting machine"; U.S. Pat. No. 1,273,756 by Fanger, entitled "Beet Topping Mechanism"; U.S. Pat. No. 1,273,757 by Fanger, entitled "Rear auger adjustment for beet harvesters"; U.S. Pat. No. 1,403,929 by Welton Sr, entitled "Beet harvester"; U.S. Pat. No. 1,436,396 by Honsinger, entitled "Root harvester"; U.S. Pat. No. 1,582,403 by Hunter, entitled "Cotton-stalk puller and binder"; U.S. Pat. No. 1,668,157 by Kopitke et al, entitled "Beet harvester"; U.S. Pat. No. 1,862,399 by Joseph, entitled "Automatic beet harvester"; U.S. Pat. No. 2,595,340 by Diethelm, entitled "Beet harvester"; and U.S. Pat. No. 2,626,497 by Bohmker, entitled "Lifter for beet harvesters". Many of these harvesters that incorporate rollers or pullers offer several advantages over the Oppel wheels and lifting shares of the prior art. One important advantage is improved extraction from the soil. The Oppel wheels may lift a large beet or rock that separates the wheels. If the next beet is much smaller, then the Oppel wheel may skip or not lift the smaller beet, because it is spread too much by the larger beet or rock. In contrast, the rollers or pullers will lift all objects that are greater in diameter than the spacing between the rollers or pullers. In addition, the rollers or pullers will generally remove more soil from the beet, simultaneous with the beet being removed from the earth. Nevertheless, these prior art rollers also tend to discharge beets to the sides of the harvester, prior to the beets being properly collected. In addition, and again depending upon the soil type and moisture content, the soil may not properly or fully separate from the beets, meaning that an undesirable and excessive amount of soil will still be collected with the harvested beets. Many of the designs will be disabled with the wet and sticky soil types, because the rollers or pullers become completely clogged. Large beets can also be sliced or significantly damaged by the pinch wheels.

As may be apparent, in spite of the enormous advancements and substantial research and development that has been conducted, there still remains a need for an improved sugar beet harvesting apparatus.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a root crop harvest apparatus. A frame has a coupling adapted to mechanically couple with a tractor. At least one field cultivator is affixed to the frame and has a ground piercing tooth. At least one disc is affixed to the frame, displaced from and trailing the at least one field cultivator along a longitudinal axis of the root crop harvest apparatus. At least four helical screw propellers are also affixed to the frame, displaced from and trailing the at least one field cultivator and the at least one disc along the longitudinal axis of the root crop harvest apparatus. A first pair of the at least four helical screw propellers are arranged in a V-shaped configuration within a plane immediately adjacent to and generally parallel to a surface of the earth. A second pair of the at least four helical screw propellers are arranged in a V-shaped configuration within a plane parallel to and above the plane defined by the first pair of at least four helical screw propellers, and extends more distally to the at least one field cultivator than the first pair of at least four helical screw propellers.

In a second manifestation, the invention is a sugar beet harvest apparatus harvest apparatus. A frame has a coupling adapted to mechanically couple with a motive power source. At least four helical screw propellers are affixed to the frame. A first pair of the at least four helical screw propellers are arranged in a V-shaped configuration within a plane immediately adjacent to and generally parallel to a surface of the earth. A second pair of the at least four helical screw propellers are arranged in a V-shaped configuration within a plane parallel to and above the plane defined by the first pair of at least four helical screw propellers, and extends more distally to the at least one field cultivator than the first pair of at least four helical screw propellers.

In a third manifestation, the invention is a sugar beet harvest apparatus configured to traverse and harvest sugar beets grown in parallel rows within the earth, the parallel rows defining a direction of sugar beet harvest apparatus travel. A frame has a coupling adapted to mechanically couple with a tractor. A pair of field cultivators are affixed to the frame, each of the pair having a ground piercing tooth. A pair of discs are affixed to the frame, displaced from and trailing the field cultivators along a longitudinal axis of the root crop harvest apparatus. At least four helical screw propellers are also affixed to the frame, displaced from and trailing the at least one field cultivator and the at least one disc along the longitudinal axis of the root crop harvest apparatus. Each individual one of the at least four helical screw propellers has a rotary hydraulic motor coupled to and driving a rotary shaft having a helically wrapped screw thread. A first pair of the at least four helical screw propellers are arranged in a V-shaped configuration within a plane immediately adjacent to and generally parallel to a surface of the earth. A second pair of the at least four helical screw propellers are arranged in a V-shaped configuration within a plane parallel to and above the plane defined by the first pair of at least four helical screw propellers, and extends more distally to the at least one field cultivator than the first pair of at least four helical screw propellers.

OBJECTS OF THE INVENTION

Exemplary embodiments of the present invention solve inadequacies of the prior art by providing in sequence a pair of field cultivator teeth, a pair of discs, and subsequent thereto a V-shaped basket of helical screw propellers. The field cultivator teeth and discs may be spaced nominally to engage both sides of a single crop row, or in an alternative embodiment may be spaced nominally to engage one side of a first crop row, and the opposed side of a second adjacent crop row. In either case, the field cultivator teeth pierce the soil and gently lift the root crop. The discs flip the beets and soil into the helical screw propellers. The helical screw propellers lift the root crop, while pushing rocks and soil rearward proximate to the soil surface.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide an improved sugar beet harvest apparatus. A second object of the invention is to provide an improved harvest apparatus that may be used to accommodate and efficiently harvest other types of root crops. Another object of the present invention is to accommodate and efficiently harvest different row spacings. A further object of the invention is to accommodate and efficiently harvest diverse sized root crops. An even further object of the invention is to optionally configure a single harvest apparatus to either harvest a single row at a time by directly engaging both sides of the row or to simultaneously harvest two adjacent rows by engaging only one side of each adjacent row. Yet another object of the present invention is to provide excellent harvesting with minimal tare and minimal crop damage in all soil types and conditions where harvesting machinery may reliably traverse the surface of the earth. An additional object of the invention is to use disaggregated soil during harvest to clean and scrub a root crop. An even further object of the invention is to provide a root crop harvesting apparatus that is inherently durable and difficult to clog or jam.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
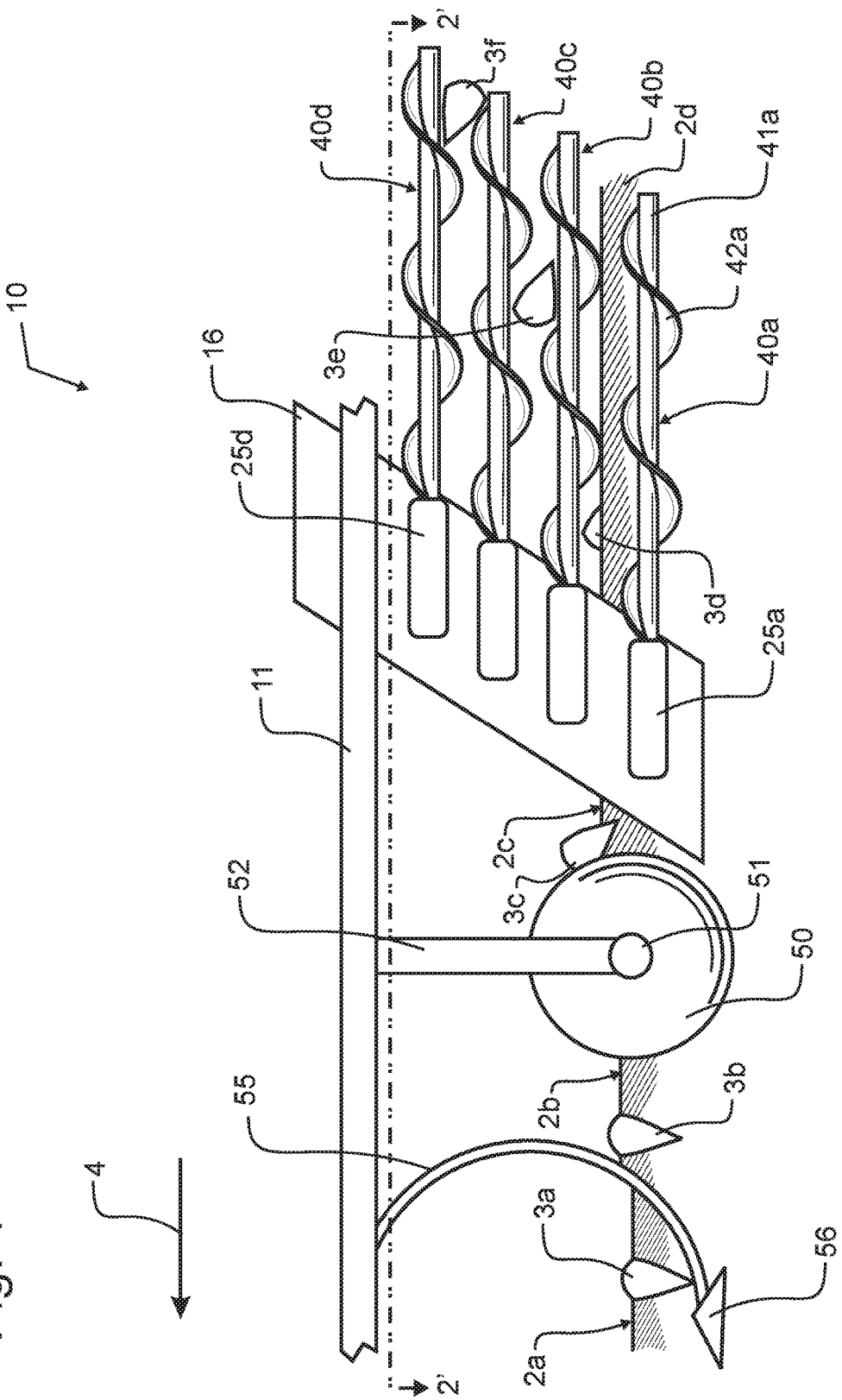
FIG. 1 illustrates a preferred embodiment sugar beet harvest apparatus designed in accord with the teachings of the present invention from a side elevational view, and further illustrating the movement of soil and beets during harvest.

Manifested in a preferred embodiment of the invention illustrated in FIG. 1, a sugar beet harvest apparatus 10 is optimally configured to lift sugar beets from the earth while simultaneously removing soil from the beets. While preferred embodiment sugar beet harvest apparatus 10 has been specifically designed for optimum operation with sugar beets, it will be apparent from the following description that the present invention may also be applied with few or no modifications to other root crops, and so any references herein to sugar beets will be understood to be referencing the preferred embodiment, but that other root crops may also be accommodated in either the preferred or alternative embodiments, depending upon the crop and soil.

Preferred embodiment sugar beet harvest apparatus 10 may be provided with a frame 11 or other suitable apparatus that may for exemplary and non-limiting purpose be coupled to a motive power source such as a prior art tractor. The motive power source will be configured as is well known in the industry to pull or otherwise propel sugar beet harvest apparatus 10 in a forward direction illustrated by direction arrow 4.

As sugar beet harvest apparatus 10 is propelled in the forward direction, a set of helical screw propellers 40 work cooperatively with a pair of discs 50 and field cultivators 55 to lift and separate topped sugar beets 3 or other suitable root crops from the earth 2. The pair of field cultivators 55 first engage with and break up the soil, while also lifting beets 3a and the surface of soil 2a to the positions illustrated by soil 2b and beet 3b. Field cultivators 55 will also lift larger obstacles and debris such as rocks out of the earth. Next, a pair of discs 50 will form a small furrow and ridge along the outsides of the planting row, for exemplary purposes only a few inches deep in the furrow, while also deflecting debris away from the crop row. This once again will lift soil to 2c and roll beets 3c into alignment with the set of helical screw propellers 40. The furrow and ridge formed by discs 50 allow a lowermost left and right pair of helical screw propellers 40a to operate on the sides of the ridge, reducing the likelihood for the helical screw threads 42a to contact the root crop in the downward half of rotation, while more extensively contacting the crop and earth in the upward half of rotation. This reduces the rotational resistance and driving power required, while also improving the efficiency of the pair of helical screw propellers 40a at lifting root crops 3 from the soil. In addition, the furrow produced by discs 50 provide a clear path for the lowermost portion of support structure 16.

As the sugar beets 3 are progressively lifted from earth 2 by the set of helical screw propellers 40, as illustrated by the sequence of sugar beets 3d, 3e, and 3f, soil is removed therefrom and dropped back to ground 2d at the trailing side of the set of helical screw propellers 40. Sugar beets 3 that have been fully cleaned and lifted by the set of helical screw propellers 40 will then be dropped or otherwise transferred onto suitable conveyance to propel lifted sugar beets into a prior art storage bin or the like, where they may be retained for some period during field harvesting, and from which they may be ultimately transferred to a land transportation vehicle such as a truck or rail car for ultimate delivery to a sugar beet processing plant. In an alternative embodiment, and not normally required or beneficial, additional prior art apparatus may be provided, for exemplary and non-limiting purpose including grabrolls, cleaning rollers, agitators, or other variants that are designed to further separate soil from the sugar beets.

Figure 4:
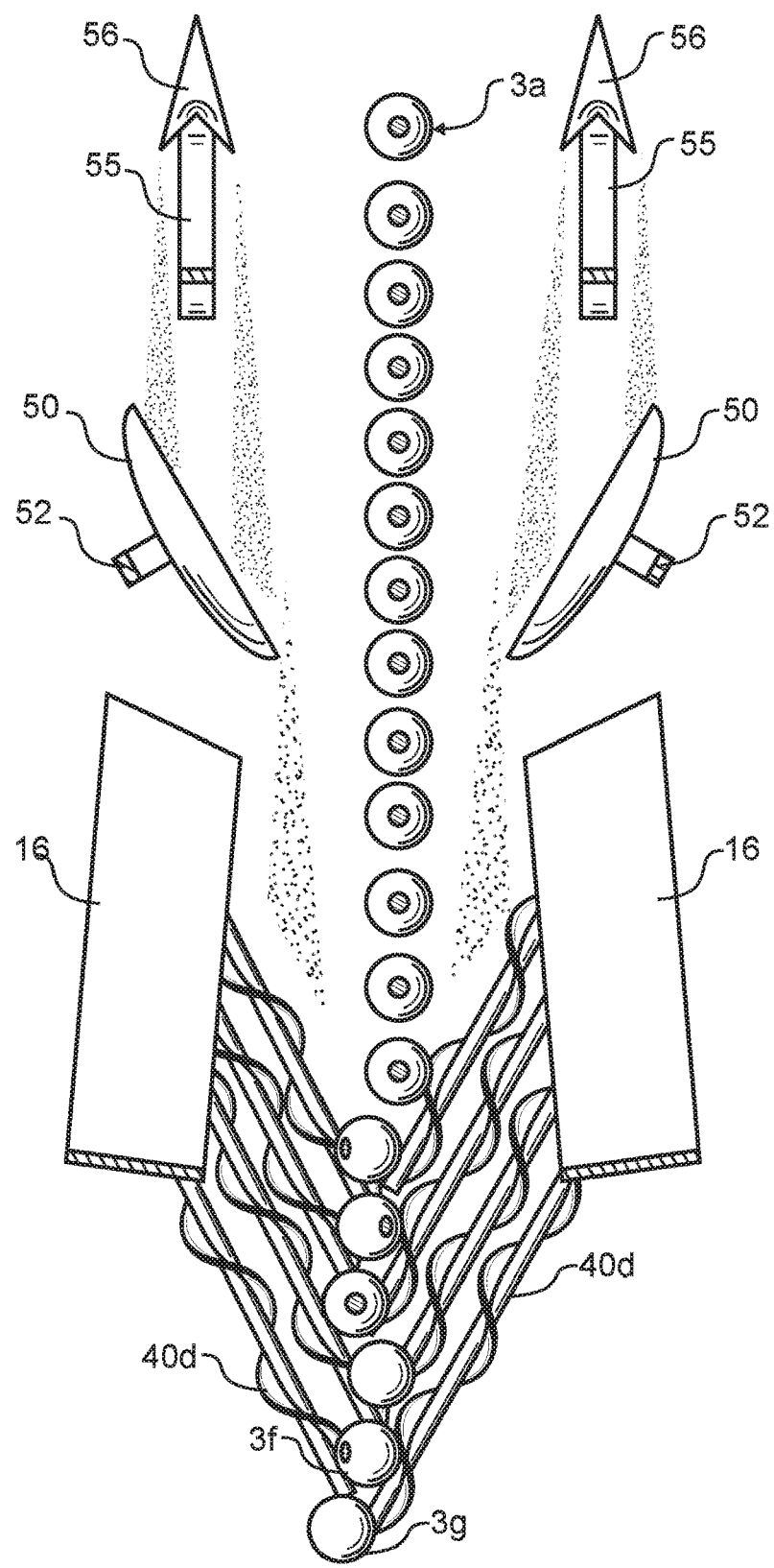
FIG. 4 illustrates the preferred embodiment sugar beet harvest apparatus of FIG. 2 from the sectioned view taken along section line 2' of FIG. 1, in further combination with soil and a single row of topped beets during harvest.
Figure 5:
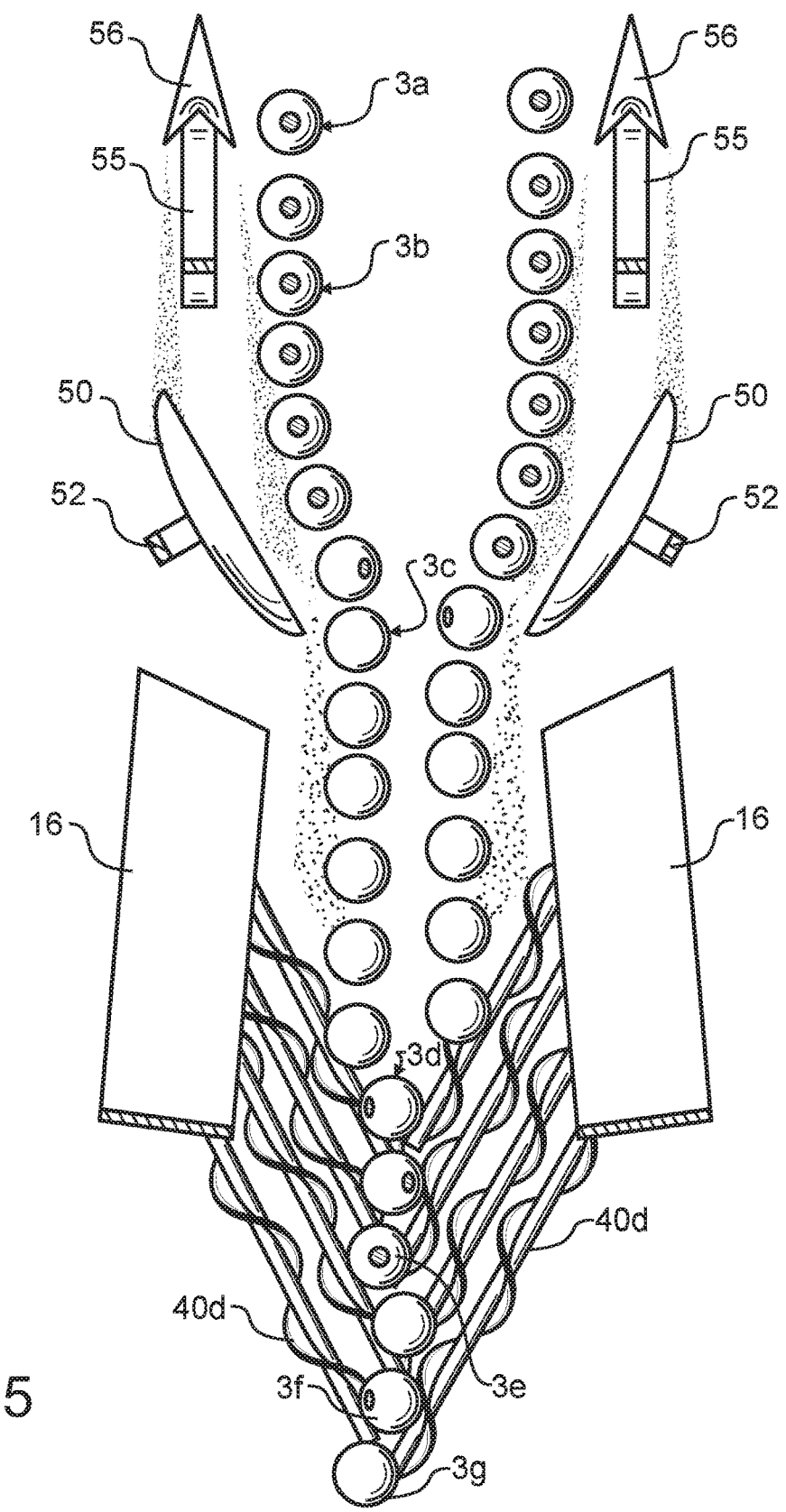
FIG. 5 illustrates the preferred embodiment sugar beet harvest apparatus of FIG. 2 from the sectioned view taken along section line 2' of FIG. 1, in further combination with soil and two rows of topped beets during harvest.

Each of the Figures illustrate a single preferred embodiment sugar beet harvest apparatus 10. A single preferred embodiment sugar beet harvest apparatus 10 will be used to lift either a single row of sugar beets from the earth during harvest, as illustrated in FIG. 4, or two parallel rows of sugar beets as illustrated in FIG. 5. However, and as may be appreciated from FIG. 1, there is sufficient space at the rear of the tractor for a plurality of preferred embodiment sugar beet harvest apparatuses 10. In fact, and most preferably, as many preferred embodiment sugar beet harvest apparatuses 10 will be provided as may be safely attached to and reliably powered and pulled by a prior art tractor or other motive power source, and for which a suitable prior art conveyor system may receive and where appropriate further process root crop from.

As may be apparent, each single preferred embodiment sugar beet harvest apparatus 10 will be aligned with either one or two rows of sugar beets. Consequently, the spacing between adjacent ones of preferred embodiment sugar beet harvest apparatus 10 will need to be set to correspond to the planting of the field. This setting may be fixed at the time of fabrication, or may be adjustable.

A plurality of rotary hydraulic motors 25a-25d are provided that may, for exemplary purposes, be powered from a pressurized hydraulic fluid ultimately delivered from a prior art tractor, owing to the availability of substantial hydraulically delivered power available from most commercially available tractors. However, in alternative embodiments these motors may be driven by other power source, for exemplary and non-limiting purpose including electrical and pneumatic power sources, though any suitable source of rotary drive may be used and will be understood to be incorporated herein.

Each one of rotary hydraulic motors 25a-25d rotate and directly drive a respective one of helical screw propellers 40a-40d. In an alternative embodiment, gearing or other suitable power transmission may be provided between one or more of the rotary hydraulic motors 25a-25d and helical screw propellers 40a-40d. For exemplary and non-limiting purpose, each one of rotary hydraulic motors 25a-25d may be affixed to and rigidly supported by support structure 16, which is in turn affixed to and rigidly supported by frame 11. Rotary hydraulic motors 25a-25d are configured to directly engage respective ones of rotary shafts 41a-41d. Extending along a portion of each one of rotary shafts 41a-41d distal from hydraulic motors 25a-25d is a respective helical screw thread 42a-42d.

Figure 3:
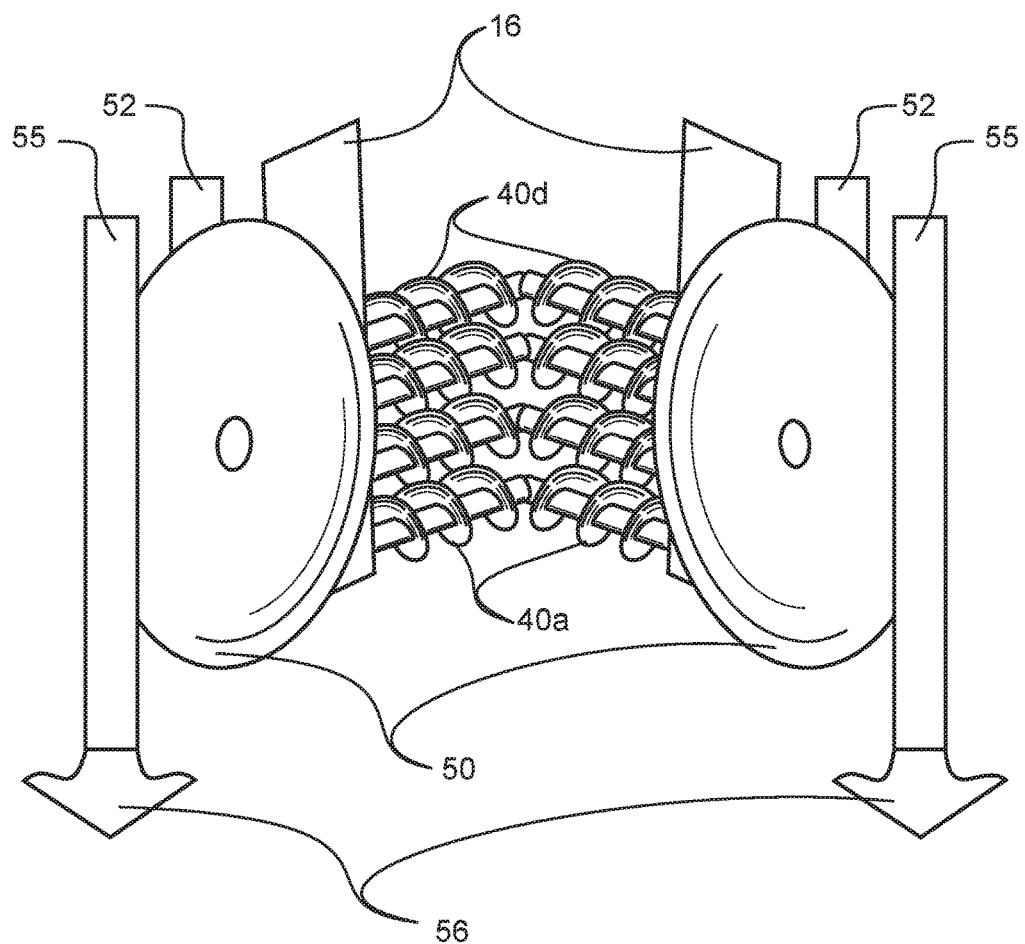
FIG. 3 illustrates the preferred embodiment sugar beet harvest apparatus of FIG. 2 from a front elevational view.

From the front view of FIG. 3, the right side helical screw propellers 40a-40d have the respective helical screw threads 42a-42 wrapped in a counter-clockwise spiral, while the left side helical screw propellers 40a-40d have the respective helical screw threads 42a-42 wrapped in a clockwise spiral. The right side helical screw propellers 40a-40d are driven to rotate in a clockwise direction, while the left side helical screw propellers 40a-40d will be rotating in a counter-clockwise direction. This direction of helical screw thread wrap and direction of rotation causes sugar beets 3 to be lifted, and dirt to be pushed in a rearward direction. In the unlikely event of a jam, it is preferable to enable rotary hydraulic motors 25a-25d or any provided power transmission to be reversed.

The left and right side helical screw propellers 40a-40d rotate at sufficiently high speed to both lift and drive sugar beets 3 rearward. By ensuring that the speed of rotation is great enough that the helical screw threads move beets 3 more rearward than the rate of forward travel of frame 11, there will be no accumulation or piling of beets and soil against the upper screw propellers 40 c and 40d, ensuring that the beets are fully separated from the soil prior to being rearwardly discharged from left and right side helical screw propellers 40a-40d.

In the process of driving beets 3 rearward and upward from the soil, the sugar beet will be pushed through adjacent soil. Lowermost helical screw propellers 40a are most preferably running immediately adjacent to an undisturbed surface of the earth such as at the level illustrated at 2a. Since the soil 2b and beet 3b are lifted slightly by field cultivator 55, and then the soil 2c and beet 3c are lifted and rolled by disc 50, this means that the lowermost helical screw propellers 40a will engage with a substantial amount of soil, thoroughly pulverizing the soil. The pulverized soil 2d is agitated with and thereby pressed against the surface of beets 3d that are in the process of being lifted from the earth. The result is a "brushing" effect of the soil surrounding the beet, where loose and pulverized soil adjacent the beet contacts and lightly brushes the surface of the sugar beet, further removing any stuck or adhered dirt. This brushing effect, which will occur in all soil types and conditions, is most pronounced with lowermost helical screw propellers 40a, when the beets are most adjacent to the dirt 2d. As a result of the combined "brushing" with surrounding soil and the agitation induced by the helical screw threads in contact with both adjacent soil and sugar beets, a large portion of the soil that would otherwise adhere to the sugar beet will be removed therefrom.

The setting of speed of rotation, selection diameter of rotary shaft 41a and helical screw thread 42a, and selection of speed of forward travel of preferred embodiment sugar beet harvest apparatus 10 for a selected root crop enables the root crop to be cleanly extracted from the soil. When the helical screw threads 42 are properly configured and then rotated at an appropriate rotational velocity, the pair of helical screw propellers 40 are far more efficient at removing soil and debris from sugar beets than the prior art Oppel wheels and lifting shares, and without the need for subsequent grabrolls, cleaning rollers, agitators, or other variants that are designed to further separate soil from the sugar beets. Proper configuration of the helical screw threads includes a combination of thread depth, thread count or thread pitch such as the number of threads per longitudinal foot of rotary shaft 41 or the spacing between threads along an axis parallel to the longitudinal axis of rotary shaft 41, and the geometry of the threads themselves. In the preferred embodiment, helical screw threads 42 are continuous, and rounded on their exterior surface distal to rotary shaft 41. This rounded exterior reduces the likelihood that threads 42 will scrape or cut the sugar beets, while the thread depth is sufficient to provide good movement of soil and sugar beets. In alternative embodiments such as may be desired with other crops or different soil types, threads 42 may be designed with different thread depth, different thread pitch or count, or more or less aggressive thread exterior. In further alternative embodiments, the threads may even be discontinuous, such as discrete thread segments, each segment separated from the next by a gap where no thread is provided. In a yet further embodiment, rather than a single helix as illustrated, several thread helixes may simultaneously wrap around rotary shaft 41. In a yet further alternative embodiment, the threads may have a rotary pattern around rotary shaft 41 that deviates from the smooth and continuous geometry of a helix, thereby potentially creating additional agitation in the soil and sugar beets.

As a result of the better effectiveness at removing soil and debris from sugar beets than the prior art, the sugar beets may be fed directly, such as by conveyor, from preferred embodiment sugar beet harvest apparatus 10 to a holding or transport bin. Prior art sugar beet harvesting equipment normally requires large and complex apparatus to remove excess soil and debris, such as grab rollers and the like. Since these are not needed in the preferred embodiment, a sugar beet harvest apparatus designed in accord with the teachings of the present invention may be substantially smaller and lighter than a prior art harvester. A lighter and less complex harvesting apparatus as taught in the present invention will have intrinsically lower materials and fabrication cost, will generate less tare, reduce overall cost at the processing facility owing to less maintenance of separating and washing tanks and the like, and will generally require lower horsepower to drive the harvesting apparatus. In addition, the preferred embodiment sugar beet harvest apparatus 10 has improved durability that is inherent in the design when compared to the prior art. The preferred embodiment sugar beet harvest apparatus 10 is much more difficult to clog or jam with rocks, and incorporates parts that are generally not susceptible to damage if contact with large rocks and the like. As a result, apparatus designed in accord with the teachings of the present invention may also be used in soil conditions worse than those that could be traversed by the prior art.

In preferred embodiment sugar beet harvest apparatus 10, the pairs of left and right helical screw propellers 40 are not parallel to each other, and instead are angularly offset so that the leading or most forward end of the pair of helical screw threads 42, immediately adjacent to rotary hydraulic motors 25, are spaced apart farther than the trailing or most rearward end distal thereto. This angular orientation between the individual ones of rotary shafts 41 enables the pairs of left and right helical screw propellers 40 to lift larger sugar beets more nearly adjacent to rotary hydraulic motors 25, while smaller sugar beets will pass more rearward before coming into contact with the left and right pairs of helical screw threads 42 and thereby being lifted from the earth.

While not separately illustrated herein, in an alternative embodiment the spacing between left and right helical screw propellers 40 may be adjustable. For exemplary purposes only and not solely limiting the invention thereto, the couplings to frame 11 may be adjustable couplers, which may for exemplary and non-limiting purpose comprise U-bolts or the like. Similarly, the couplings between rotary hydraulic motors 25 and support structure 16 may also be adjustable. This allows an operator to adjust the spacing between the individual ones of rotary shafts 41a-41d. Varying the spacings can enable preferred embodiment sugar beet harvest apparatus 10 to accommodate differing row spacings, differing sizes of root crops being harvested, or differing soil conditions.

While normally not required or desired, in further alternative embodiments, the couplings between rotary hydraulic motors 25 and support structure 16 may also be tiltable, such as providing a slot rather than a hole at either the leading or trailing edge through which fasteners will pass. Once again, this tilt may also be used to enable preferred embodiment sugar beet harvest apparatus 10 to accommodate differing sizes of root crops being harvested, or differing soil conditions.

Figure 2:
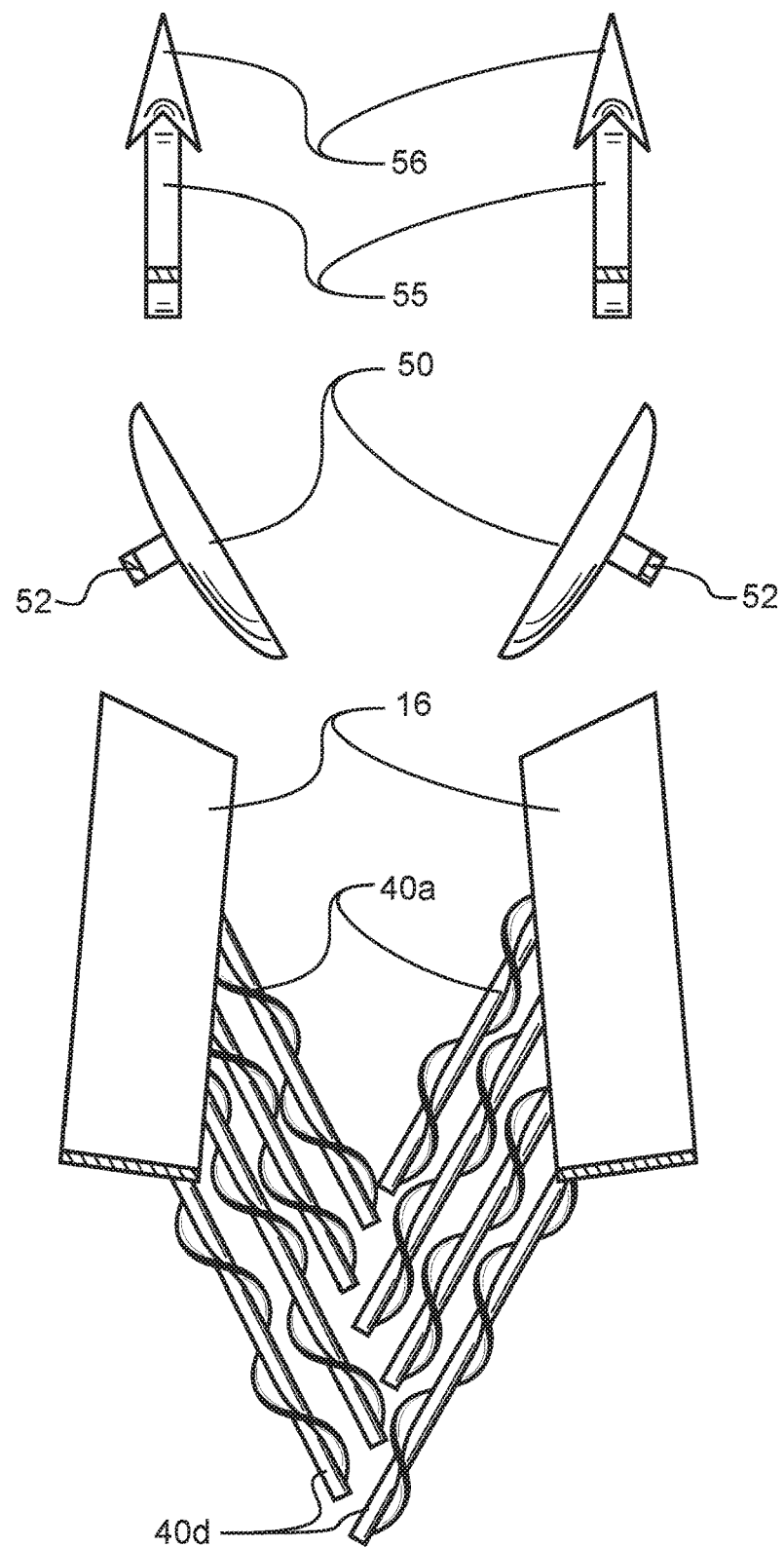
FIG. 2 illustrates the preferred embodiment sugar beet harvest apparatus of FIG. 1 from a sectioned view taken along section line 2' of FIG. 1.

As may be best illustrated in FIGS. 4 and 5, the same or only slightly adjusted preferred embodiment sugar beet harvest apparatus 10 may be used to harvest either a single row or two adjacent rows of sugar beets 3. As illustrated in FIG. 4, preferred embodiment sugar beet harvest apparatus 10 will move forward with the row of beets roughly centered between field cultivators 55. The beets will be progressively lifted by the left and right side helical screw propellers 40a-40d. The staggered unsupported ends of the left and right side helical screw propellers 40a-40d distal to rotary hydraulic motors 25 ensure that the beets will remain supported and not drop to the earth. The alternating patterns as visible in FIG. 2 lead to a sort of stair stepping of the beets, where beets that first engage with right side helical screw propeller 40a will be pushed upward toward right side helical screw propeller 40b, but also toward left side screw propellers 40a and 40b. Those beets in contact with left side screw propellers 40a and 40b will again not only be pushed upward, but also will be moved by the helical thread toward the unsupported end of right side helical screw propeller 40b. Similarly, beets in contact with right side screw propellers 40b and 40c will again not only be pushed upward, but also will be moved by the helical thread toward the unsupported end of left side helical screw propellers 40c and 40d. Finally, beets in contact with left side screw propellers 40c and 40d will again not only be pushed upward, but also will be moved by the helical thread toward the unsupported end of right side helical screw propeller 40d. After being fully lifted by the uppermost left and right side helical screw propellers 40d, as illustrated by beet 3f, the beets will then be discharged or dropped from the uppermost left and right side helical screw propellers 40d as illustrated by beet 3g. Sugar beets 3g that have been fully cleaned and lifted by the set of helical screw propellers 40 will then be dropped or otherwise transferred onto suitable conveyance to propel lifted sugar beets into a prior art storage bin or the like, where they may be retained for some period during field harvesting, and from which they may be ultimately transferred to a land transportation vehicle such as a truck or rail car for ultimate delivery to a sugar beet processing plant.

While a total of eight left and right side helical screw propellers are illustrated in preferred embodiment sugar beet harvest apparatus 10, it will be understood herein that a minimum of four helical screw propellers may be used, with two on each of the left and right sides. There is no limit to the number of propellers that may be used, but adding extra propellers beyond the eight illustrated decreases the benefit gained, while adding to the total parts count and increasing the weight and energy required to drive the apparatus.

FIG. 5 illustrates the simultaneous harvesting of two parallel rows with a single preferred embodiment sugar beet harvest apparatus 10. As illustrated, field cultivators 55 run adjacent to the outside edge of the two row pair, breaking up the soil and slightly lifting the beets. In an alternative embodiment, two additional field cultivators 55 may be provided, with each one of the pair adjacent to the inside of one of the pair of rows, thereby providing a field cultivator 55 on each side of each row of beets 3.

The beets in FIG. 5 are numbered to directly correspond to the illustration of FIG. 1, providing a top view of the movement of the beets. The discs 50 push the beets inward, tending to roll them along with the soil into the center, where they will be collected, cleaned, and lifted by the left and right side helical screw propellers 40a-40d, in the same manner as already described herein above.

As may be apparent from FIGS. 4 and 5, preferred embodiment sugar beet harvest apparatus will accommodate very different row spacing, ranging for exemplary purposes from 17" used in some locales to 30" used in others. Likewise, since nothing within preferred embodiment sugar beet harvest apparatus 10 will trap or constrain the beets, and instead each of the components simply lift the beets, preferred embodiment sugar beet harvest apparatus 10 will accommodate and work very well with beets of very diverse size.

The helical screw propellers 40a-40d may be of different lengths. For exemplary and non-limiting purpose, in preferred embodiment sugar beet harvest apparatus 10, helical screw propellers 40a are approximately 12" in length, while helical screw propellers 40d are approximately 34" in length. Helical screw propellers 40a-40c are identical in diameter, while helical screw propellers 40d are preferably somewhat smaller to reduce bruising. There is minimal bruising to the root crop adjacent to helical screw propellers 40a-40c, owing to the presence of soil therein cushioning the root crop. However, by the top helical screw propellers 40d, there may not be sufficient soil to provide desired cushioning, and so a smaller diameter is preferred for these. Nevertheless, the length and diameter of the various helical screw propellers may be varied, and will be chosen by a designer in light of the present disclosure.

Preferred embodiment sugar beet harvest apparatus 10 will be suitably supported and positioned relative to the earth in a manner such as is also known in the prior art and for exemplary and non-limiting purpose taught and illustrated in both my provisional patent application and the many patents incorporated by reference herein above. As but one example, a pair of adjustable support chains may be used to suspend a parallel linkage from a frame. The support chains set a maximum depth into the earth that preferred embodiment sugar beet harvest apparatus 10 will reach relative to the frame, by limiting the amount a top and generally horizontal arm of the parallel linkage may tilt down into the earth. Support chains may also be substantially shortened to facilitate transportation of preferred embodiment sugar beet harvest apparatus 10 to and from a field to be harvested. Once at the field and aligned with one or more rows to be harvested, an operator will then stop and extend the support chains, prior to starting to harvest.

One or a plurality of gauge wheels may also set and maintain a predictable height for discs 50 and field cultivators 55 relative to the top of the soil. These gauge wheels may be provided at the front, along the sides, or even at the rear of apparatus 10, and the number, size and location of these wheels will be selected by a machine designer to meet particular criteria that are well known and understood in the industry.

A diagonal spring may be provided that runs diagonally across opposite corners of parallel linkage may be used to create tension that helps to pull the left and right pair of helical screw propellers 40a-40d down into the surface of the earth. However, when an obstacle such as a large rock is encountered, the diagonal spring will lengthen, allowing the parallel linkage to deflect and the left and right pair of helical screw propellers 40a-40d to lift from the soil surface. Consequently, this type of parallel linkage in combination with diagonal spring assists in depth control of each individual preferred embodiment sugar beet harvest apparatus 10 provided in combination with a tractor or other motive power source. When there are a plurality of these preferred embodiment sugar beet harvest apparatuses 10 provided to facilitate the harvesting of a plurality of rows simultaneously, this means each individual preferred embodiment sugar beet harvest apparatus 10 will follow the contour of the crop row which it is harvesting from, helping to ensure excellent harvesting regardless of the number of rows being harvested in a single pass. While springs and chains are described, other apparatus may be provided such as pneumatic tensioners or other known equivalent tensioners or adjusters, including those that incorporate sensors and electronic technology.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A root crop harvest apparatus, comprising:
   a frame having a coupling adapted to mechanically couple with a tractor;
   at least one field cultivator affixed to said frame and having a ground piercing tooth;
   at least one disc affixed to said frame, displaced from and trailing said at least one field cultivator along a longitudinal axis of said root crop harvest apparatus; and
   at least four helical screw propellers affixed to said frame, displaced from and trailing said at least one field cultivator and said at least one disc along said longitudinal axis of said root crop harvest apparatus;
   a first pair of said at least four helical screw propellers arranged in a V-shaped configuration within a horizontal plane configured to be immediately adjacent to and generally parallel to a surface of the earth; and
   a second pair of said at least four helical screw propellers arranged in a V-shaped configuration within a plane parallel to and above said plane defined by said first pair of said at least four helical screw propellers, and extending more distally to said at least one field cultivator than said first pair of said at least four helical screw propellers.

2. The root crop harvest apparatus of claim 1, wherein said at least one disc further comprises a pair of discs configured to form a plow furrow and ridge in the earth, said first pair of said at least four helical screw propellers operative on opposed slopes of said plow ridge.

3. The root crop harvest apparatus of claim 1, wherein said at least one field cultivator further comprises a pair of field cultivators spaced from each other in a direction generally transverse to said longitudinal axis, each of said pair of field cultivators having a ground piercing tooth.

4. The root crop harvest apparatus of claim 2, wherein said at least one field cultivator further comprises a pair of field cultivators spaced from each other in a direction generally transverse to said longitudinal axis, each of said pair of field cultivators having a ground piercing tooth.

5. The root crop harvest apparatus of claim 1, wherein each individual one of said at least four helical screw propellers further comprises a rotary motor coupled to and driving a rotary shaft having a helically wrapped screw thread.

6. The root crop harvest apparatus of claim 5, wherein said at least four helical screw propellers further comprises eight individual helical screw propellers arranged in four V-shaped configurations, each of said four V-shaped configurations extending progressively more rearward and upward than the next lower adjacent V-shaped configuration.

7. A sugar beet harvest apparatus, comprising:
a frame having a coupling adapted to mechanically couple with a motive power source;
at least four helical screw propellers affixed to said frame;
a first pair of said at least four helical screw propellers arranged in a V-shaped configuration within a horizontal plane configured to be immediately adjacent to and generally parallel to a surface of the earth; and
a second pair of said at least four helical screw propellers arranged in a V-shaped configuration within a plane parallel to and above said plane defined by said first pair of said at least four helical screw propellers, and extending more distally than said first pair of said at least four helical screw propellers.

8. The sugar beet harvest apparatus of claim 7, further comprising at least one field cultivator affixed to said frame and having a ground piercing tooth, said at least one field cultivator leading said at least four helical screw propellers along a longitudinal axis of said sugar beet harvest apparatus.

9. The sugar beet harvest apparatus of claim 8, wherein said at least one field cultivator further comprises a pair of field cultivators spaced from each other in a direction generally transverse to said longitudinal axis, each of said pair of field cultivators having a ground piercing tooth.

10. The sugar beet harvest apparatus of claim 7, further comprising at least one disc affixed to said frame, said at least one disc leading said at least four helical screw propellers along a longitudinal axis of said sugar beet harvest apparatus.

11. The sugar beet harvest apparatus of claim 10, wherein said at least one disc further comprises a pair of discs spaced from each other in a direction generally transverse to said longitudinal axis and configured to form a plow furrow and ridge in the earth, said first pair of said at least four helical screw propellers operative on opposed slopes of said plow ridge.

12. The sugar beet harvest apparatus of claim 10, further comprising at least one field cultivator affixed to said frame and having a ground piercing tooth, said at least one field cultivator leading said at least one disc along a longitudinal axis of said sugar beet harvest apparatus.

13. The sugar beet harvest apparatus of claim 7, wherein each individual one of said at least four helical screw propellers further comprises a rotary motor coupled to and driving a rotary shaft having a helically wrapped screw thread.

14. The sugar beet harvest apparatus of claim 7, wherein said at least four helical screw propellers further comprises eight individual helical screw propellers arranged in four V-shaped configurations, each of said four V-shaped configurations extending progressively more rearward and upward than the next lower adjacent V-shaped configuration.

15. A sugar beet harvest apparatus configured to traverse and harvest sugar beets grown in parallel rows within the earth, said parallel rows defining a direction of sugar beet harvest apparatus travel, comprising:
a frame having a coupling adapted to mechanically couple with a tractor;
a pair of field cultivators affixed to said frame, each of said pair of field cultivators having a ground piercing tooth;
a pair of discs affixed to said frame, displaced from and trailing said at least one field cultivator along a longitudinal axis of said root crop harvest apparatus; and
at least four helical screw propellers affixed to said frame, displaced from and trailing said at least one field cultivator and said at least one disc along said longitudinal axis of said root crop harvest apparatus, each individual one of said at least four helical screw propellers having a rotary hydraulic motor coupled to and driving a rotary shaft having a helically wrapped screw thread;
a first pair of said at least four helical screw propellers arranged in a V-shaped configuration within a horizontal plane configured to be immediately adjacent to and generally parallel to a surface of the earth; and
a second pair of said at least four helical screw propellers arranged in a V-shaped configuration within a plane parallel to and above said plane defined by said first pair of said at least four helical screw propellers, and extending more distally to said at least one field cultivator than said first pair of said at least four helical screw propellers.

16. The sugar beet harvest apparatus of claim 7, wherein said at least four helical screw propellers further comprises eight individual helical screw propellers arranged in four V-shaped configurations, each of said four V-shaped configurations extending progressively more rearward and upward than the next lower adjacent V-shaped configuration.

* * * * *